United States Patent [19]

Buckley et al.

[11] Patent Number: 4,707,375

[45] Date of Patent: Nov. 17, 1987

[54] STRUCTURED FOOD PRODUCTS AND PROCESS

[75] Inventors: Keith Buckley, Melton Mowbray; Colin T. Prest, Stathern; Paul Wilkinson, Quorn, all of England

[73] Assignee: Mars G. B. Limited, London, England

[21] Appl. No.: 836,440

[22] Filed: Mar. 5, 1986

[30] Foreign Application Priority Data

Mar. 8, 1985 [GB] United Kingdom ................ 8505980

[51] Int. Cl.$^4$ ............................................. A23L 1/195
[52] U.S. Cl. .................................. 426/578; 426/521; 426/636; 426/661; 426/805
[58] Field of Search ........................ 426/636, 578, 661

[56] References Cited

U.S. PATENT DOCUMENTS 4,247,562  1/1981  Bernotavicz ........................... 426/72

FOREIGN PATENT DOCUMENTS 1225452  3/1971  United Kingdom ................ 426/578

OTHER PUBLICATIONS

Lii et al., The Factors in the Gel Forming Properties of Mesona Procumbens Abstracted in Chemical Abstracts, vol. 94(1981), Abst. No. 119692h.
Grant "Hackhs Chemical Dictionary" McGraw Hill Book Co., (1969) pp. 634–635.

Primary Examiner—R. B. Penland
Attorney, Agent, or Firm—Curtis, Morris & Safford

[57] ABSTRACT

A structured food or animal feed product comprises a gel formed by the interaction of water soluble components of Chinese grass with amylose or high amylose starch having an amylose content not below 25% by weight. In making the product the amylose or high amylose starch is mixed and allowed to interact in an aqueous medium with water soluble components of Chinese grass, with the optional inclusion of other nutritious material, whereby a gellable mixture is produced, which is formed into solid pieces.

13 Claims, No Drawings

STRUCTURED FOOD PRODUCTS AND PROCESS

The present invention relates to structured food products and processes for their preparation.

By "food" is here meant not only food for human consumption but also nutritional ("feed") compositions for consumption by pets and other animals. By "structured products" is meant coherent solid products of firm texture.

In the manufacture of food products it is commonly required to prepare compositions in coherent pieces or chunks having "structure" in the above sense. Where the resulting product is to be canned, it has to withstand the heat and moisture of the sterilisation process without breakdown of the structure, and this places very stringent requirements on the structuring system employed.

Among gelling agents that are used to confer a solid structure on food compositions is edible starch of various kinds, but starch gels have a number of disadvantages, being notably brittle and in many cases of relatively poor resistance to the heat and moisture of sterilisation processes.

Chinese grass (*Mesona chinesis, Mesona procumbens*) is a herb known in China, where its aqueous extract or infusion is used as a refreshing or tonic drink. In GB No. 1 225 452 there are described jelly products containing an aqueous extract of Chinese grass in admixture with certain starches. The starches mentioned, however, have a relatively low amylose content, for example, below 20% amylose in the case of tapioca starch. In general, unfractionated or non-hybridised natural starches contain only about 15–20% amylose.

We have now discovered that water soluble or water dispersible constituents of Chinese grass will interact in an aqueous medium with amylose, or starches containing a relatively high proportion of amylose, to produce firm, elastic solid pieces which are stable to pasteurisation or heat sterilisation, for example in canning or bottling.

The lowest amylose content at which such interaction begins to be significant is about 25% and there is no upper limit, but it is preferred that the amylose content of the starch used lies between 50 and 70% by weight. Typical starches of this kind are the various high amylose hybrid maize varieties, pea starch, and amylose fractions separated from potato starch. It is also possible to employ natural starch sources of high amylose content, for example, ground whole oats.

The grass extractive on its own has no binding or gellation properties. Moreover, although high amylose starch alone may be used to produce pieces that are stable to heat, the texture obtained is pasty or inelastic, and a much greater quantity of this expensive starch required than when it is used in conjunction with the grass extractive in accordance with this invention. In addition to having an improved texture or "bite", gel products according to this invention have a more juicy mouth feel, and their reduced carbohydrate content enhances their usefulness in dietetic or diabetic prepared foods. Other nutritious ingredients, for example meat, fruit, vegetables, may be readily incorporated during the preparation of the food structure, usually in the form of solid pieces of particles.

The water soluble constituents of Chinese grass may be obtained by aqueous extraction of the raw material, but it is also possible to obtain the desired effect by adding the raw material itself, preferably powdered, to an aqueous solution of high amylose starch or to water or aqueous liquid used in the preparation of the food product.

There are additional advantages to be obtained from the use of powdered grass over and above those achieved by use of the extract. Apart from avoiding the need for extraction, which is a not inconsiderable saving, the gel products obtained have a more fibrous meaty texture. It is also possible to use lower equivalent percentages of the soluble Chinese grass constituents and/or a lower percentage of starch. The colouration of the product is somewhat reduced. Use of the grass as such also enables a wider range of textures to be obtained.

The starch content employed in the product can vary from 0.1% to 20% depending on the type of starch used and upon the texture required in the product, but is preferably from 5% to 10% concentration.

The ratio of grass extract to starch to be used depends on the purity and quality of the extract but can range from 1 part of extract to 20 parts starch up to 10 parts extract to 1 part of starch. A preferred level is 1 part of extract to 4–5 parts of starch. Appropriate proportions of dry grass material to starch correspond to the preferred amounts of extract, but, the preferred ratios are 1:10 to 30:1, most typically 1:2 to 2:1.

In forming structured food products according to the invention, a mixture of food ingredients may be prepared which includes the high amylose starch and the Chinese grass or extract. The starch may be pre-gelatinised by heating with water before addition to the mixture. The mixture may be thoroughly mixed and heated in the presence of water, and subsequently formed into layers or chunks and allowed to cool. The solidified product may be further divided into chunks. Alternatively, the mixture can be mixed with water, formed into layers or chunks, subsequently heated, for example in an oven, and thereafter allowed to cool. The solid product may again be further subdivided.

Typical products incorporating this invention may contain by weight from 10 to 80% meat, fish or vegetable protein material, or other nutritional solids, from 0.1% to 20%, preferably 4–10%, high amylose starch and from 0.05 to 50%, preferably 1–3%, Chinese grass extract or from 1 to 70%, preferably 2–15%, powdered Chinese grass, the balance being water and such minor ingredients as flavouring, additives and the like.

The following are examples of the practice of the invention, together with comparisons of the effect obtained when a relatively low amylose starch is substituted.

EXAMPLE 1

Preparation of extract

An extract of Chinese grass was prepared by taking one kilogram of dry *Mesona chinesis* and boiling it under reflux conditions with 13 liters of distilled water and 160 grams of sodium hydrogen carbonate for 4 hours. The solution is then separated from the solids using a fine mesh bag and a wine press. This solution is then flash distilled down to 1.5 liters before being poured into foil trays and dried in an oven at 105° C. for 24 hours. The dried extract can then be collected and finely ground in a hammer mill. The yield based on the original dry grass weight is between 25 and 30%.

Preparation of gel chunk

The recipe used was a follows:

|  | Weight | Percentage |
|---|---|---|
| Chicken offal | 2130 g | 42.6% |
| Amylomaize starch product containing 50% amylose ('Gelose 50') | 250 g | 5.0% |
| Chinese grass extract powder | 62.5 g | 1.25% |
| Water | 2558 g | 51.15% |

The chicken offal was comminuted by passing through a mincer and the remaining ingredients mixed with it. The mixture was transferred to a pressurised heating vessel, heated to 120° C. and held at this temperature for 10 minutes. The mixture was allowed to cool to 95° C. and transferred to metal foil trays. After being cooled to room temperature the solidified material was cut into cubes and incorporated at 10% level into a pet food recipe comprising a mixture of raw meats and gravy. This mixture was put into cans, sealed and sterilised at 125° C. for one hour. After being cooled the chunks in the product were found to have a fairly firm, elastic juicy texture resembling cooked kidney pieces.

Comparative example

Tapioca starch, which has a natural amylose content of 15-20%, was used to contrast the effect with that of the high amylose starch used above. Two recipes were used:

|  | A | B |
|---|---|---|
| Minced meat | 2130 g | 2130 g |
| Tapioca starch | 200 g | 375 g |
| Grass extract | 50 g | 95 g |
| Water | 2620 g | 2400 g |

In each case the powders were dispersed in the water mixed with the meats and heated to the boiling point. The hot mixture was poured into a tray and allowed to cool. The solid material was cut into cubes, mixed with raw meats and gravy, canned and sterilised as described in Example 1.

After cooling, no chunks could be found in those cans where cubes of Recipe A has been incorporated. They had disappeared during sterilisation.

Less than half the number of Recipe B chunks had survived sterilisation and these had a very soft and brittle texture such that difficulty was experienced in separating the chunks integrally from the rest of the product.

EXAMPLE 2

In this example the high amylose starch ('Gelose 50') was pregelatinised before reaction with the grass extract. 75 mg of Gelose 50 was dispersed in 240 ml water, put into cans, sealed and sterilised at 125° C. for one hour. After being cooled the resulting opaque solid was repeatedly minced to a fine slurry and this was mixed with 426 g minced meat offal, 240 g water and 19 g of grass extract.

The mixture was heated to the boiling point with continuous agitation and then allowed to cool to room temperature in trays.

The solid material obtained was cut into cubes, mixed with raw meats and gravy, canned and sterilised as described in Example 1.

After being cooled, the chunks in the product were found to have a very firm, elastic texture.

EXAMPLE 3

Both the grass extract and the grass itself may be incorporated into oven-formed meat in which there is a proportion of a suitable starch. The effect is to reduce by at least ⅓ the amount of starch required to produce chunks of a given strength.

The following recipe employs the extract:

|  | Weight | Percentage |
|---|---|---|
| Meat mix | 3897 g | 77.9% |
| Ground whole oats (27% amylose) | 491 g | 9.8% |
| Chinese grass extract powder | 100 g | 2.0% |
| Water | 515 g | 10.3% |

The ingredients were mixed together in a bowl and the mixture emulsified through a 5 mm plate.

Conventionally, starch is incorporated at a 15% level in the absence of Chinese grass: a further mixture was prepared in this way by way of comparison.

The emulsion containing grass extract was notably stiffer than the conventional recipe at this stage. The emulsion was formed into ribbons and heated in a 250° C. oven for 2 minutes. After being cooled, the chunks were cut into cubes. The chunks containing grass extract were tougher at this point than those produced by the conventional receipt. They were then mixed with a gravy, canned, sealed and sterilised as before.

Whilst the chunks formed without grass extract were relatively firm after sterilisation, they were pasty and tended to fuse together. Those incorporating grass extract were more integral and resilient, and also firmer and more elastic.

EXAMPLE 4

The following example shows how chunks can be prepared using a high amylose starch and raw grass instead of *Mesona chinesis* extract as described previously.

The grass was first pulverised through a 1 mm screen using a Retsch Mill to yield a mid-brown low density 'flake'. This was included in a high amylose starch-based meat chunk, at 10/3 times the level of extract used, to compensate for an assumed 30% extraction yield, according to the following procedure:

| Finely minced chicken mix | 42.6% by weight |
|---|---|
| Gelose 50 | 7.5% by weight |
| Pulverised Chinese grass | 6.3% by weight |
| Sodium bicarbonate | 1.0% by weight |
| Water | 42.6% by weight |

The ingredients were mixed together to give a stiff paste. This was transferred into the vessel of a scraped-surface heat exchanger and heated to 120° C. The mixture was maintained at this temperature for 10 minutes to ensure complete starch gelatinisation.

The mixture was allowed to cool to 95°-100° C., then removed from the heat exchanger into a tray and further cooled to ambient temperature.

The resulting slab of material was cut into chunks of approximately 1 cm³. These were firm and elastic, being brown/black in colour with lighter brown flecks. They had a faint but characteristic, slightly herbal odour. The measured chunk strengths were greater than those of similar chunks prepared with the extract, although the chunks were subjectively judged to be rather more brittle.

The chunks prepared above were included at a 10% level into a standard cat food formulation, replacing offal meats. The mixture was canned and sterilised under pressure for about 1 hour.

After sterilisation the chunks containing Chinese grass had remained integral and well dispersed although they had deformed slightly. They were dark brown in colour and of a meat-like consistency.

The measured post-sterilisation chunk strengths of the chunks prepared with raw non-extracted grass were greater than those formed with the extract.

We claim:

1. A pasteurized or sterilized structured food or animal feed product comprising:

0.1–20 percent by weight of amylose or high amylose starch having an amylose content not below 25 percent by weight and, interacted therewith to form a gel, water soluble components of Chinese grass in a weight proportion from 1:20 to 10:1 parts if calculated as a dry water soluble extract of Chinese grass or from 1:10 to 30:1 if calculated as unextracted Chinese grass material; and a sealed container containing said structured food or animal feed product which has been pasteurized or sterilized by heat processing; whereby said water soluble components of Chinese grass are employed as a thickening agent for said gel at pasteurizing or sterilizing temperatures.

2. A structured product according to claim 1, wherein the amylose or starch content is from 5 to 10%.

3. A structured product according to claim 2, wherein the weight ratio of Chinese grass extract to amylose or starch is from 1:4 to 1:5.

4. A structured product according to claim 1, wherein unextracted Chinese grass material is employed in a weight ratio to starch of 1:10 to 30:1.

5. A structured product according to claim 4 wherein the ratio of grass material to starch is in the range of 1:2 to 2:1.

6. A structured product according to claim 1, wherein a high amylose starch is employed having an amylose content of 50 to 70% by weight.

7. A structured product according to claim 1, which additionally comprises pieces or particles of nutritious material, said pieces or particles being embedded or incorporated in said gel.

8. A structured product according to claim 7 wherein said nutritious material comprises meat, fish, or vegetable protein solids.

9. A structured product according to claim 8 comprising from 10 to 80 percent by weight of meat, fish, or vegetable protein material, from 4 to 10 percent of high amylose starch, and from 1 to 3 percent of Chinese grass extract or 2 to 15 percent of powdered Chinese grass, the balance being water and flavoring, additives.

10. A method of making a pasteurized or sterilized structured food or animal feed product comprising the steps of:

preparing a mix containing amylose or high amylose starch having an amylose content of not less than 25 percent by weight, water soluble components of Chinese grass, and an aqueous medium wherein the water soluble components of Chinese grass are mixed with said amylose or starch in weight proportions of from 1:20 to 10:1 part in the case of a dry water soluble extract or from 1:20 to 30:1 in the case of unextracted Chinese grass material;

interacting with said amylose with said water soluble components to produce an aqueous gellable mixture;

forming said gellable mixture into solid gel pieces;

sealing said pieces in a container; and subjecting said container to heat processing to sterilize, or pasteurize the contents thereof whereby said water soluble components of Chinese grass are employed as a thickening agent for said gel at pasteurizing or sterilizing temperatures.

11. A method according to claim 10 including the additional step of incorporating into said mix a nutritional quantity of meat, fish, or vegetable protein solids.

12. A method according to claim 10, comprising the preliminary steps of:

boiling Chinese grass in water to extract the water soluble components;

separating the solution from the residual solids;

and evaporating said solution to provide said water soluble components in dry form.

13. A method according to claim 10, comprising the additional steps of:

comminuting dry Chinese grass;

and adding the comminuted material to the aqueous medium and the amylose or high amylose starch.

* * * * *